US009083555B1

(12) United States Patent
Gumas et al.

(10) Patent No.: US 9,083,555 B1
(45) Date of Patent: Jul. 14, 2015

(54) TRAFFIC CHANNEL ACCESS DURING ACQUISITION CONGESTION

(75) Inventors: Charles C. Gumas, Fairfax, VA (US); Robert J. Kikta, North Bend, WA (US)

(73) Assignee: Exelis Inc., McLean, VA (US)

( * ) Notice: Subject to any disclaimer, the term of this patent is extended or adjusted under 35 U.S.C. 154(b) by 432 days.

(21) Appl. No.: 13/446,372

(22) Filed: Apr. 13, 2012

(51) Int. Cl.
*H04J 3/14* (2006.01)
*H04L 12/54* (2013.01)

(52) U.S. Cl.
CPC ................... *H04L 12/5602* (2013.01)

(58) Field of Classification Search
CPC ............................ H04L 47/10; H04L 12/5602
USPC .......................................................... 370/232
See application file for complete search history.

(56) References Cited

U.S. PATENT DOCUMENTS

| | | | |
|---|---|---|---|
| 5,898,681 A * | 4/1999 | Dutta | 370/229 |
| 6,542,739 B1 | 4/2003 | Garner | |
| 7,471,654 B2 | 12/2008 | Mueckenheim et al. | |
| 7,650,379 B2 | 1/2010 | Hart et al. | |
| 2002/0118661 A1 | 8/2002 | Voce | |
| 2010/0002582 A1 | 1/2010 | Luft et al. | |
| 2010/0103850 A1* | 4/2010 | Gossain et al. | 370/312 |
| 2010/0311433 A1 | 12/2010 | Lindskog et al. | |

* cited by examiner

*Primary Examiner* — Shripal Khajuria
(74) *Attorney, Agent, or Firm* — Edell, Shapiro & Finnan LLC

(57) ABSTRACT

Techniques for acquisition of traffic channels during acquisition congestion of a communication include receiving a broadcast message at a communication terminal from a network node. The broadcast message indicates to the communication terminal that one or more acquisition channels in the communication network are congested. The broadcast message also identifies a set of traffic channels currently available or likely to become available for use by the communication terminal. The set of traffic channels may include traffic channels that are currently being used by other communication terminals. The communication terminal then selects and monitors a subset of the set of traffic channels for an indication that a first one of the traffic channels in the selected subset is available for use by the communication terminal. The communication terminal then transmits traffic on the first traffic channel.

26 Claims, 4 Drawing Sheets

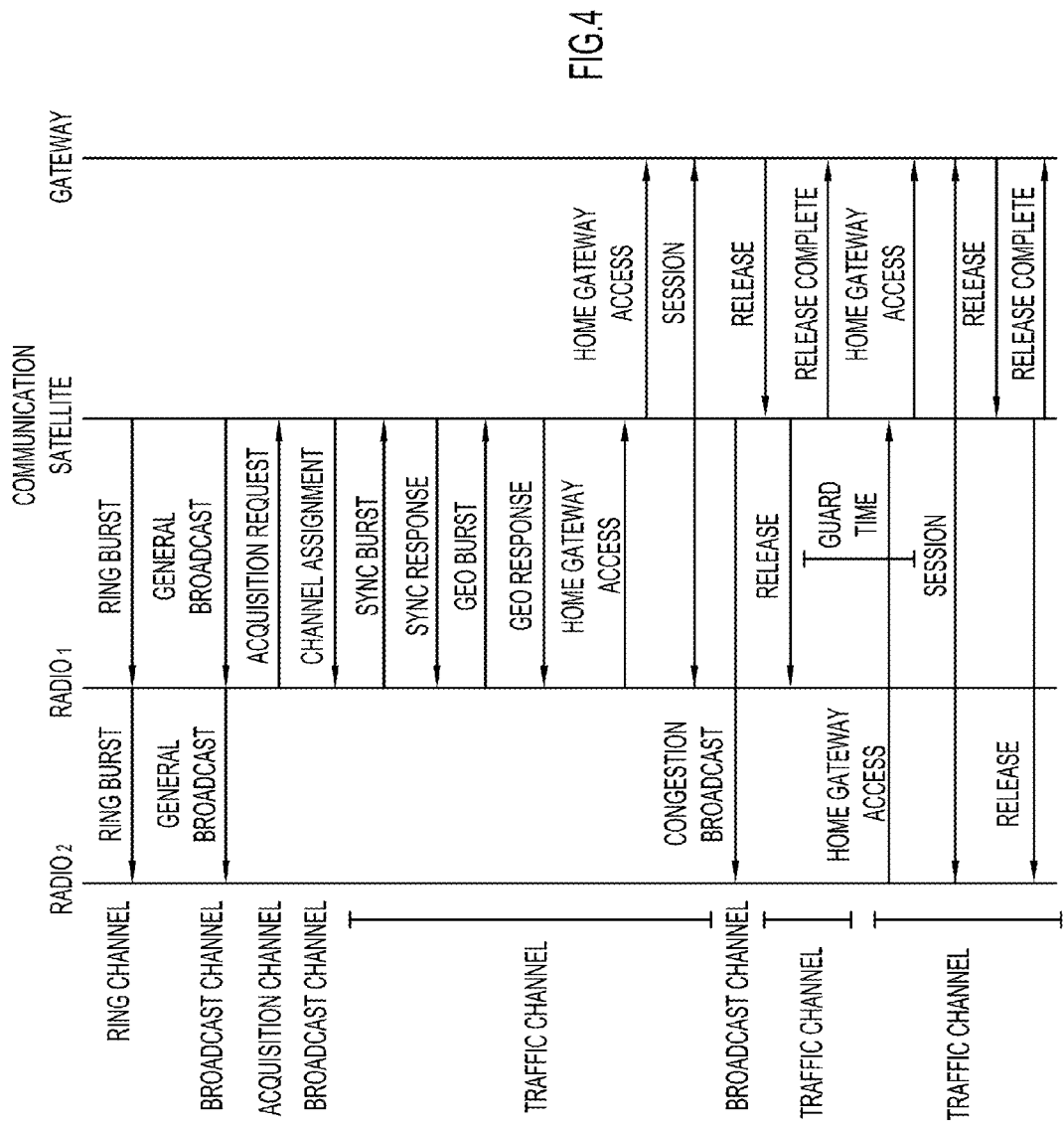

TRAFFIC CHANNEL ACCESS DURING ACQUISITION CONGESTION

BACKGROUND

It is well known that when a communication terminal intends to transmit voice signals and/or data (i.e., make a call), the communication terminal does not initially have any network resources (traffic channels) dedicated thereto. Instead, conventional communication networks include one or more random access channels that are used by all communication terminals within a given boundary to acquire traffic channels. One or more network nodes are responsible for the orderly allocation of traffic channels to communication terminals. More specifically, a communication terminal will signal to a network node (e.g., satellite, base station, etc.) that the terminal intends to transmit. The network node then provides the communication terminal with a traffic channel assignment. Because the random access channels are used by the terminals to acquire traffic channels, the random access channels are referred to herein as acquisition channels.

Generally, a plurality of communication terminals may operate within a given boundary, but the communications terminals do not have knowledge of each other. As such, it is possible that multiple communication terminals could attempt to simultaneously access a particular acquisition channel. This simultaneous access by the communication terminals may result in collisions between the access attempts, effectively blocking the communication terminals from accessing the network at that instant even though traffic channels may still be available for use. Because there is congestion at the acquisition channels, the communication network is referred to herein as experiencing "acquisition congestion." Acquisition congestion may cause all of the communication terminals to wait a period of time before re-attempting an access of the acquisition channel, thereby causing delays that can be noticeable to a user. These delays can directly affect the efficiency and perceived level of quality of service (QoS) of the communication network. As such, communication networks need techniques to improve performance when the network experiences acquisition congestion.

SUMMARY

Devices, methods and instructions encoded on computer readable medium are described herein for acquisition of traffic channels by a communication terminal during acquisition congestion of a communication network. In one technique, a broadcast message is received, at a communication terminal, from a network node. The broadcast message indicates to the communication terminal that one or more acquisition channels in the communication network are congested. The broadcast message also identifies a set of traffic channels likely to become available for use by the communication terminal. The set of traffic channels may include traffic channels that are currently being used by other communication terminals. The communication terminal then selects a subset of the set of traffic channels, and monitors the selected subset for an indication that a first one of the traffic channels in the selected subset is available for use by the communication terminal. The communication terminal then transmits traffic on a first such available traffic channel.

When the one or more acquisition channels in the communication network are not congested, a communication terminal is configured to acquire a traffic channel by transmitting a channel acquisition request to the network node via one of the acquisition channels. In one embodiment, the communication terminal is configured to select the subset of the set of traffic channels, monitor the subset of traffic channels, and transmit the traffic on the first traffic channel without sending a channel acquisition message to the network node via an acquisition channel.

Additionally, when the one or more acquisition channels in the communication network are not congested, a communication terminal is configured to synchronize with the network node before transmitting traffic. In one embodiment, the communication terminal is configured to transmit the traffic on the first traffic channel without synchronizing with the network node.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

FIG. 4 is a signaling diagram illustrating a sequence of messages conveyed between a network node and a communication terminal for gaining access to the communication network during acquisition congestion.

DETAILED DESCRIPTION

Figure 1:
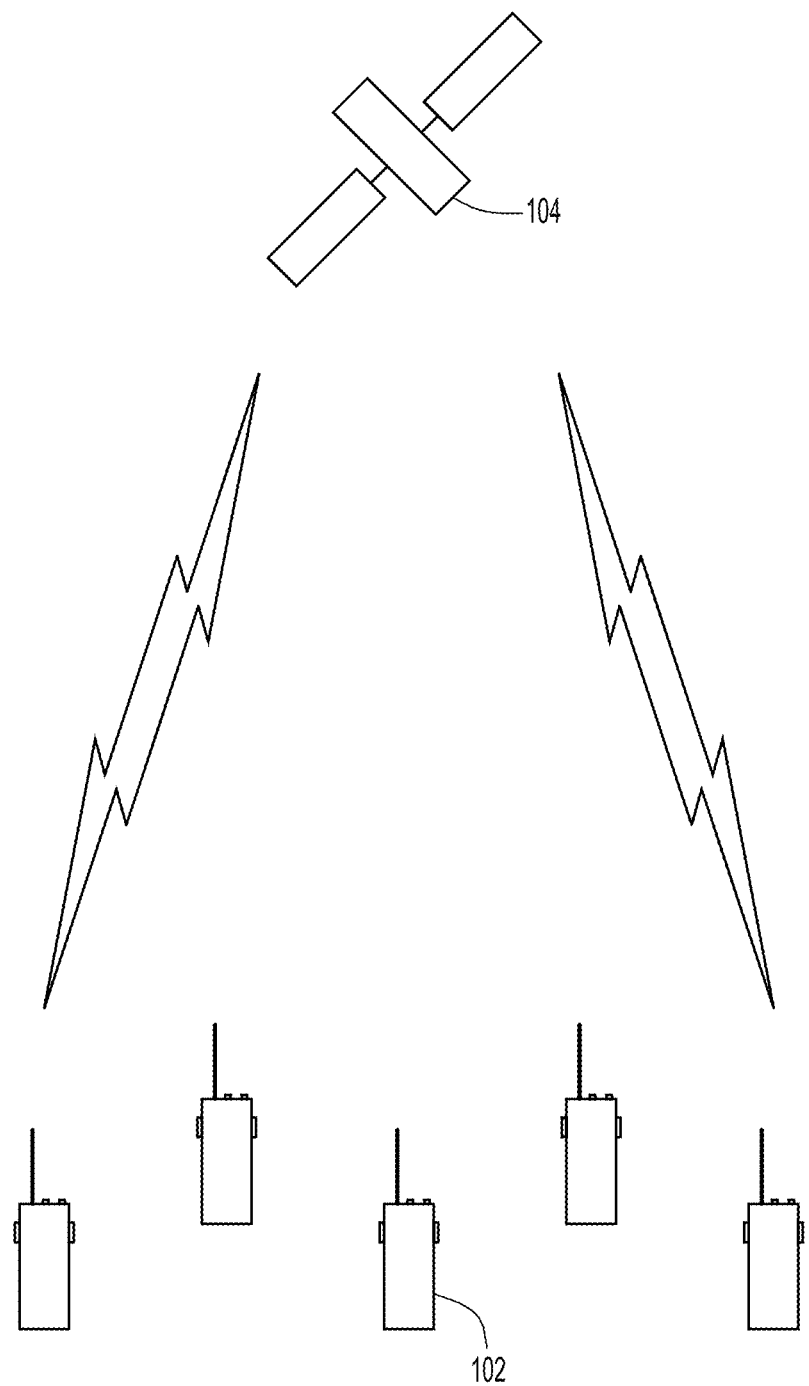
FIG. 1 is a conceptual diagram illustrating a portion of a satellite communication system including a group of terrestrial communication terminals located within the same satellite beam coverage area and communicating with an Earth-orbiting satellite.

The techniques described herein for accessing a communication network during acquisition congestion are suitable for implementation in a wide variety of communication systems including cellular, WiMAX, low Earth orbit (LEO) satellite communications (e.g., the Iridium® and Globalstar® systems), and geostationary Earth orbit (GEO) satellite communications (e.g., the Thuraya®, Inmarsat® and MUOS systems). Iridium is a registered trademark of Iridium Satellite LLC, Globalstar is a registered trademark of Globalstar Inc., Thuraya is a registered trademark of Thuraya Satellite Telecommunications Company, and Inmarsat is a registered trademark of the International Mobile Satellite Organisation. FIG. 1 conceptually illustrates an example context involving a satellite communication system such as the Iridium® satellite system.

The Iridium® satellite system provides worldwide voice and data service to geographically distributed subscriber units/terminals (e.g., radios) using a constellation of low Earth orbit satellites. Each satellite contributes an array of antenna spot beams such that the satellite constellation provides coverage over the entire surface of the Earth. More specifically, geographically distributed subscriber terminals 102 are capable of transmitting radio signals to, and receiving radio signals from, satellites in the Iridium® satellite constellation (one such satellite 104 is shown in FIG. 1). The Iridium® terminals 102 can be wireless radios, telephones or some form of data modem devices and can transmit and receive voice signals and/or data (e.g., text, image, video, etc.). At any given time, there are approximately 66 operational satellites in the Iridium® constellation, and each satellite has a total of 48 spot beams per satellite. Since the satellites are in low Earth orbit, the region of the Earth's surface covered by each of the individual antenna beam patterns is constantly shifting.

Conventionally, when a subscriber transmits voice and/or data signals (i.e., places a call) from an Iridium® subscriber terminal, the transmission traverses the network via an uplink from the terminal to a satellite. The satellite, acting as a router, may direct the transmission to another subscriber terminal or to an Earth terminal facility via a downlink or to another satellite via a cross link, with the transmission ultimately being down linked to another subscriber terminal or to an Earth terminal facility by another satellite. The Earth terminal facilities provide a radio-link interface between the satellites and other terrestrial facilities, such as gateway facilities linking calls to other networks. The techniques described herein can be employed within the context of the netted Iridium service, satellite communications in general, or other types of communication networks in which a terminal uses random access channels to access the network.

Figure 2:
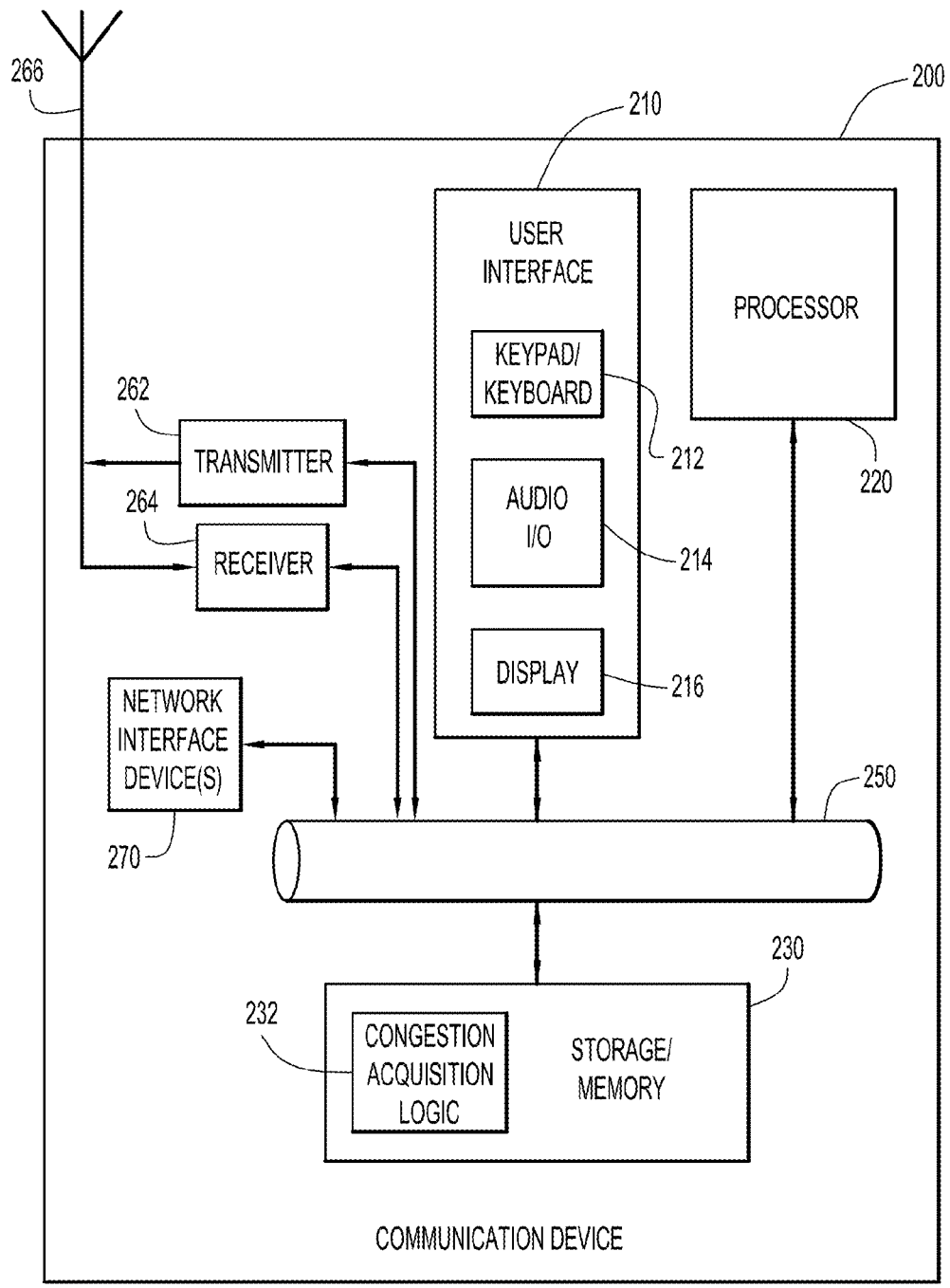
FIG. 2 is a notional block diagram illustrating major components of a communication terminal.

FIG. 2 is a block diagram illustrating an example of a communication terminal 200 configured to operate with a network node (e.g., satellite 104) to acquire a traffic channel during acquisition congestion of a communication network. As used herein, the term communication terminal or simply "terminal" can be any device capable of transmitting and/or receiving signals, including but not limited to: a fixed-position or mobile RF transmitter or receiver, a handheld or body-mounted radio; any type of wireless or mobile telephone (e.g., analog cellular, digital cellular, or satellite-based); a radio carried on, built into or embedded in a ground-based or airborne vehicle; a satellite-mounted transmitter or receiver; or any electronic device equipped with wireless transmission or reception capabilities, including multimedia terminals capable of transmitting and/or receiving audio, video, and data information. As used herein, the term "terrestrial" refers to any ground-based, maritime, or airborne location (i.e., not in orbit or in space).

Communication terminal 200 includes a transmitter 262 and a receiver 264 coupled to an antenna 266 for transmission and reception of signals. For example, transmitter 262 is capable of transmitting message signals through antenna 266 to a receiving terminal (e.g. a satellite 104) in the network. Receiver device 264 is capable of receiving message signals through antenna 266 from other terminals in the network (e.g., from a satellite). Transmitter 262, receiver 264, and antenna 266 can be configured to communicate virtually any type of content, including but not limited to: audio/voice signals and data signals, including video or visual display signals, and any other types of media or content.

Communication terminal 200 includes one or more network interface device(s) 270 configured to connect (wired or wirelessly) to terrestrial wired or wireless networks. These terrestrial wired or wireless networks may comprise, for example, local area networks (LANs), wide area networks (WANs) (e.g., the Internet), or other private commercial or government networks.

Communication terminal 200 includes a user interface 210 that allows a user to interact with device 200 (e.g., send and receive voice or audio signals; enter text, data, commands, etc.; and view images, video, text, data, etc.). User interface 210 can include a display device 216, data input devices such as sensors or various types (optical, audio, environmental), keypad/keyboard 212, and/or an audio input/output 214 such as a microphone and speaker. Optional display device 216 can be any of a wide variety of known devices, such as an LCD display. Optional keypad/keyboard 212 allows a human user to enter alphanumeric characters and can be configured as a physical device and/or as a keyboard or keypad depicted on display device 216. In the latter case, characters can be selected by moving a cursor, or by touching the screen in the case of a touch-screen display. It will be appreciated that user interface 210 may include other types of data-entry devices such as a cursor control device, joystick, etc.

It would be appreciated that the user interface 210 of FIG. 2 may only be present in certain communication terminals. In other embodiments, the communication terminal may additionally or alternatively include an application interface that allows a computing application or computing device (e.g., computer, server, etc.) to control and/or interact with device 200 (e.g., send and receive voice or audio signals; enter text, data, commands, etc.; and view images, video, text, data, etc.). In certain circumstances, the application interface may optionally include a display and/or other elements as known in the art.

Communication terminal 200 further includes a processing capability represented in FIG. 2 by processor module 220. Processor 220 is capable of executing program instructions (i.e., software) for carrying out various operations and tasks. For example, processor 220 can interpret and respond to data and commands received from receiver 264 or network interface device(s) 270, perform computations, cause message signals to be transmitted by transmitter 262 or network interface device(s) 270, cause information to be stored, and control the display 216 of user interface 210 (or an application interface). Processor 220 is, for example, a microprocessor, a microcontroller, a digital signal processor, etc.

A storage capability of terminal 200 is represented by storage/memory module 230, which can store information relating sensor data such as position location information (PLI) derived from reception of global positioning system (GPS) signals or the like, as well as other data or information. Storage/memory module 230 can also store program instructions (i.e., software) to be executed by processor 220 to carry out operations. For example, in this configuration storage/memory 230 includes congestion acquisition logic 232. Thus, the operations and methodologies described herein can be carried out by executing instructions stored on a computer readable medium (i.e., software) on a processor or processors located within communication terminal 200. As used herein, the term "computer readable medium" refers to non-transitory (tangible) media (e.g., memory or storage devices). Storage/memory module 230 is a tangible processor-readable or computer-readable memory that stores or is encoded with instructions (congestion acquisition logic 232) that, when executed by processor 220, causes processor 220 to perform the functions described herein. While FIG. 2 shows a processing environment comprising a data processor 220 that executes software stored in storage/memory module 230, an alternative processing environment may include a fixed data processing element, such as an application specific integrated circuit (ASIC) that is configured, through fixed hardware logic, to perform the functions of the logic. Yet another possible data processing environment is one involving one or more field programmable logic devices or firmware, or a combination of fixed processing elements and programmable logic devices.

The interconnections between the components of communication terminal 200 are represented generally in FIG. 2 with a bus structure 250. In general, user interface 210, an application interface, processor 220, storage/memory module 230, transmitter 262, and receiver 264 can be interconnected in any suitable manner.

Multiple communication terminals are associated with a satellite when the communication terminals operate in a common satellite beam coverage area provided by the satellite. In the context of the Iridium® satellite system, the constellation of low Earth orbit satellites is constantly orbiting the Earth. Even in the context of geostationary satellite systems, communication devices may move from one region to another (e.g., when deployed on aircraft). As such, a communication terminal may be associated with different satellites during different time periods.

Communication networks generally include different channels that are configured for different purposes. For example, the communication network may include one or more broadcast channels that are used by a network node to transmit messages that are received at each of the communication terminals currently associated with the network node. Additionally, the communication network may also include a plurality of traffic channels that are used by the communication terminals to transmit and/or receive voice signals and/or data. The communication network may also include one or more random access channels (acquisition channels) that are shared by all communication terminals associated with a network node to gain access to the network.

It will be appreciated that various different types of channels may be used in various embodiments described herein. For example, channels may be physically separated by frequency, logically separated by time, logically separated by waveform or encoding structure, any combination of the above, etc.

In order for a communication terminal to transmit, the communication terminal first needs to acquire one of the traffic channels. In general, the acquisition of a traffic channel occurs through the use of an acquisition channel. More specifically, a communication terminal will transmit a channel acquisition request to the network node via an acquisition channel. The channel acquisition request is a message directing the network node to allocate an available traffic channel to the communication terminal. The network node responds to the channel acquisition request with a message, via the broadcast channel, that identifies an open traffic channel for use by the communication terminal. This technique is sometimes referred to herein as an acquisition channel method.

In certain circumstances, a plurality of communication terminals may attempt to substantially simultaneously access the communication network via the one or more acquisition channels. Because there generally are a small number of acquisition channels relative to traffic channels, there may be insufficient acquisition bandwidth to process all of these channel acquisition requests. Acquisition bandwidth limitations may be manifested by limitations in the frequencies, timeslots, waveform types, or encoding parameters that define acquisition channels, or may be manifested by other limitations within a network node, such as processor resources, that prevent a network node from servicing additional acquisition requests. Accordingly, acquisition congestion occurs such that communication terminals are unable to access the available traffic resources on the communication network (i.e., there is congestion at the acquisition channels even while there are available traffic channels). This acquisition congestion may cause delays in access to the network that directly affect the efficiency and perceived level of quality of service (QoS) of the communication network. Described herein are techniques for accessing the communication network during acquisition congestion so as to reduce and/or substantially eliminate the delays that occur in conventional communication networks.

Figure 3:
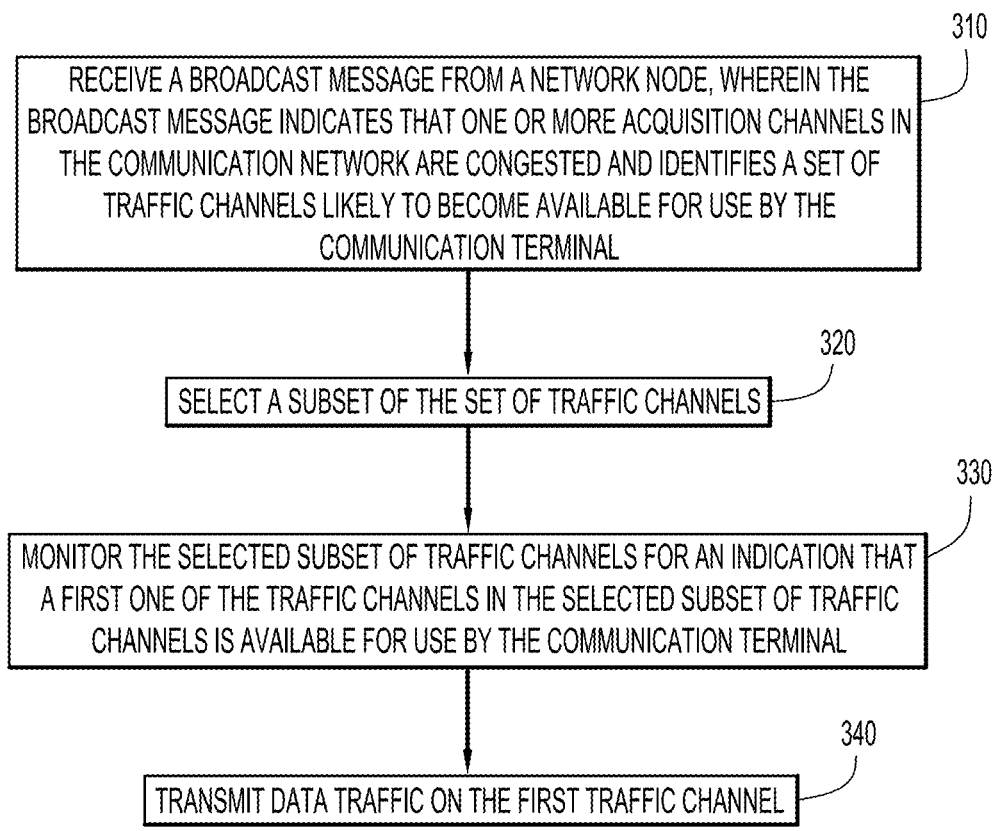
FIG. 3 is a functional flow diagram of operations performed by a communication terminal to gain access to the communication network during acquisition congestion.

Operations performed by a communication terminal to acquire a traffic channel during acquisition congestion in accordance with the disclosed techniques are shown in the flow diagram of FIG. 3 at a top level. In operation 310, a broadcast message is received from a network node. The broadcast message indicates that one or more acquisition channels in the communication network are congested. The broadcast message also identifies a set of traffic channels likely to become available for use by the communication terminal. In operation 320, the communication terminal selects a subset of the set of traffic channels identified in the broadcast message.

In operation 330, the communication terminal monitors the selected subset of channels for an indication that a first one of the traffic channels in the selected subset of traffic channels is available for use by the communication terminal. As will be better understood from the examples provided below, the selected subset of channels may be currently used by another communication terminal for transmitting/receiving traffic and the communication terminal monitors the traffic on the subset of traffic channels for a release message.

Referring still to FIG. 3, in operation 340, the communication terminal transmits traffic (voice or data signals) on the first available traffic channel. As will be described in the following examples, the communication terminal transmits this traffic without synchronizing with the network node.

It should be noted that, in ordinary circumstances, it may be preferable for communication terminals to access traffic channels via the acquisition channel method since that conventional method is typically intended to result in contention-free use of the traffic channels. The techniques described herein for use during acquisition may result in communication terminals bypassing the acquisition channel method and accessing traffic channels directly. Because these techniques may introduce risk of interference at the traffic channel (and additional techniques may be required to mitigate such risks), communication systems may or may not be designed to employ these techniques by default, unless acquisition contention exists.

The following examples illustrate the concepts related to acquiring a traffic channel during acquisition congestion in the context of the Iridium® satellite communication system. In this context, circumstances may occur where a plurality of terminals (subscriber units) located in the same geographic area attempt to access the Iridium® satellite communication system at substantially the same time. As used herein, the same geographic area is sized such that the plurality of terminals are associated with the same satellite during given periods of time (i.e., the terminals lie within the same satellite beam coverage area). In one such example, a group of soldiers deployed in a military exercise and having Iridium-equipped radios may need to report their positions, relay tactical information or commands, etc., to each other and/or to a local or central command center. Using a conventional Iridium® service, each terminal will attempt to acquire a traffic channel using the limited number of acquisition channels, thereby creating acquisition congestion that could prevent all terminals from accessing the network or cause significant delays for certain terminals in accessing the network. Such situations are undesirable, particularly in military circumstances where timely access to the communication network is critical to safety and to achieving military objectives. Such situations are also undesirable in commercial applications where the exchange is time sensitive, such as applications where users await a reply before taking an action, or in applications where remotely controlled devices require near-real-time responses.

FIG. 4 is a signaling diagram illustrating within this example embodiment a sequence of messages conveyed between transmitting terminals (e.g., terrestrial subscriber units) and a receiving network node (e.g., a communication satellite) to acquire and use a traffic channel. The satellite periodically (e.g., every 90 ms) broadcasts a Ring Burst message on a ring channel. In the case of the Iridium® system, the low Earth orbits of the satellites cause the satellites to travel from horizon to horizon in about ten minutes. The Ring Burst messages convey information that allows terrestrial terminals essentially to determine where the broadcasting satellite is in the sky, determine whether the satellite is gaining or waning, measure angular velocity and Doppler shift to enable determination of the correct frequency for communication, and to obtain necessary timing information for communication.

Additionally, the satellite periodically/continually transmits a general broadcast message to its associated terminals (i.e. terminals that lie within the satellite coverage area). This general broadcast includes an indication, commonly referred to as a blocking bit, as to whether the satellite is accepting new channel acquisitions. The blocking bit provides the satellite with a mechanism by which the satellite is able to stop any further acquisitions when the acquisition channels and/or the traffic channels are severely congested. As such, in conventional arrangements, the use of this blocking bit prevents any further channel acquisitions and causes all communication terminals to wait a period of time before access is granted.

If the general broadcast message indicates that the communication satellite is accepting new acquisitions, the communication system (and the components thereof) may operate in a conventional "standard acquisition mode." In the standard acquisition mode, the communication terminals acquire a traffic channel through use of an acquisition channel. More specifically, when a first terminal (represented by $Radio_1$ in FIG. 4) wishes to establish a communication session with a satellite, the terminal transmits an acquisition request message to the satellite on an acquisition channel (which may be at a different frequency from the ring channel). Upon successfully receiving the acquisition request message, the satellite broadcasts a channel assignment message on a broadcast channel, indicating a traffic channel (e.g., a specific frequency) the requesting terminal should use to transmit its messages during a communication session. Note that other terminals (represented by $Radio_2$ in FIG. 4) within the same satellite antenna beam also receive this information and are therefore aware that a communication session is being established between the $Radio_1$ and the satellite. In operation, each of the communication terminals has a randomly assigned identifier. The identifier for the $Radio_1$ is embedded in the channel assignment message, thereby enabling the $Radio_1$ to determine which channel it is assigned.

Continuing with the standard acquisition mode, once the traffic channel has been assigned, the $Radio_1$ transmits a Syncburst message on the assigned traffic channel to the satellite. The Syncburst message allows the satellite to evaluate how accurately the required timing and frequency are known by the $Radio_1$. The satellite measures timing and frequency offsets between the received Syncburst message and the correct values. In response to the Syncburst message, the satellite will send a Syncresponse message to the $Radio_1$. If the timing and frequency errors are within tolerance levels, the Syncresponse is a Switch to Traffic message that notifies the $Radio_1$ that traffic can be sent on the traffic channel. If the timing and frequency errors determined from the Syncburst message are not within acceptable tolerances, the Syncresponse message is a reply message to the $Radio_1$ that contains correction information. In this case, the $Radio_1$ will then send another Syncburst message using timing and frequency values adjusted according to the feedback information provided by the satellite. This process can be repeated until the timing and frequency values used in the Syncburst message received by the satellite are within acceptable tolerances or until a maximum number (e.g., three) of Syncburst messages have been sent.

In certain circumstances, the $Radio_1$ may also transmit a Geoburst message to the satellite. The Geoburst is essentially a request to the satellite for information that assists $Radio_1$ in determining its geographic location. The satellite responds to the Geoburst message with a Georesponse message that includes the requested information. It will be appreciated that, for many communication systems, the communication terminals are configured to determine their geographic information without assistance, thus for such systems the Geoburst and Georesponse messages are unnecessary and may not be used. Alternatively, the terminals and/or satellites may exchange their own coordinates, which they know or have determined by other means, to help promote synchronization.

After synchronization with the satellite, the $Radio_1$ transmits a home gateway access message to the satellite. This home gateway access message may optionally include routing information, geographic data, service type, a user identifier, and other information. The communication satellite inspects the routing information in the home gateway access message to identify the gateway to which the information in the home gateway access message should be forwarded. The communication satellite repackages the contents of the home gateway access message into a second, differently formatted home gateway access message that is sent to the identified gateway. The gateway is a ground station that uses the contents of the home gateway access message to determine the type of service (e.g., voice, video, data, etc.) requested by the $Radio_1$.

Next, a two-way exchange, referred to as the communication session, occurs between the $Radio_1$ and the gateway. This two-way exchange may include different types of messages and exchanges depending on, for example, the type of service. The details of such two-way exchanges are well known in the art and will not be described in detail herein.

When the communication session is completed, the session is torn down. In general, this may occur from either the terminal or gateway side. In this example, the gateway transmits a release message to the satellite and the satellite transmits a corresponding release message to the $Radio_1$. A release complete message may also be transmitted from the satellite back to the gateway. After release, the satellite places the channel into a so-called "guard" or cool-down time where, in conventional arrangements, the satellite will hold the channel open (i.e., it does not assign the channel to another communication terminal). The satellite holds the channel open in the event the $Radio_1$ wants to transmit again to the gateway. The guard time may be, for example, 5 to 10 seconds, depending on the configuration.

In certain circumstances, multiple communication terminals may, while operating in the standard acquisition mode, attempt to substantially simultaneously transmit an acquisition request via the limited number of acquisition channels, thus resulting in collisions and congestion on the acquisition channels. The communication satellite is configured to detect when the communication system has entered, or is in danger of entering, a congestion state at the acquisition channels. As used herein, the state of the communication system when the acquisition channels are congested, or are in danger of becoming congested, is collectively and generally referred to herein as acquisition congestion. It will be appreciated that a number of different algorithms, metrics, or techniques may be employed by the satellite to detect acquisition collisions and acquisition congestion.

When the satellite detects acquisition congestion, the communication system (and the components thereof) enters a "congestion acquisition mode." In the congestion acquisition mode, the satellite is configured to transmit a congestion broadcast message on a broadcast channel. This congestion broadcast message, when received by the communication terminals, causes the terminals to each enter and operate in the congestion acquisition mode. When in the congestion acquisition mode, at least some of the communication terminals are configured to acquire a channel by bypassing (skipping) the acquisition request and channel assignment steps of the standard acquisition mode. Example operation of a communication terminal while in the congestion acquisition mode is shown in FIG. 4 with reference to the $Radio_2$. Again it will be appreciated that a number of different algorithms and techniques may be employed to direct the acquisition mode of operation of a communications terminal.

As noted, the congestion broadcast message received from the communication satellite indicates to the $Radio_2$ (and any other Radios associated with the satellite) that the acquisition channels are, or are likely to be, congested (i.e., the communication network is experiencing acquisition congestion). The congestion broadcast message also identifies a set (e.g., 1 or more) of traffic channels that are likely to become available for use by $Radio_2$. The format of the congestion broadcast message and the set of traffic channels identified in the congestion broadcast message may take a number of different forms. In one embodiment, the set of traffic channels may include channels that are currently allocated to other terminals for different types of communication sessions. Because the techniques are designed to reduce delays in accessing the communication network, the set of traffic channels identified in the congestion broadcast message may be only channels used for short-burst communications (i.e., communication sessions that have a short time length in the range of approximately 1-10 seconds). If a terminal is waiting for another terminal to finish its transmission, then if such transmission are of a short-burst type, there may be some confidence that the wait will be bounded and/or acceptable. In a further example, the set of traffic channels may be all or a large number of traffic channels, and may be accompanied by an indication of the type of communication session that currently exists on the channel (i.e., an indication of whether the current session is a short-burst communication session, a voice call, a data session, etc.).

$Radio_2$ is configured to evaluate the set of traffic channels in the broadcast message in order to select a subset (e.g., 1 or more) of the set of traffic channels. After the subset of traffic channels is selected, the $Radio_2$ is configured to monitor (listen to) the traffic on the selected one or more channels. Because the information received from the satellite in the congestion broadcast message may take different forms, the evaluation process executed by the $Radio_2$ may also take a number of different forms. For example, the $Radio_2$ may be configured to use one or more different algorithms to evaluate the information received from the satellite in the broadcast message to select the channels. In one simple embodiment, the congestion broadcast message includes a flag indicating that all or a large number of traffic channels could become available and the $Radio_2$ is configured to select one or more of the identified traffic channels to monitor. This selection may be random or based on some predetermined rules.

As noted, acquisition congestion occurs because multiple terminals are attempting to acquire a traffic channel at substantially the same time. As such, in the congestion acquisition mode, these multiple terminals may also simultaneously evaluate received congestion broadcast messages and select a traffic channel for monitoring. The techniques described herein include a mechanism to prevent the communication terminals from attempting to access the same set of traffic channels. In one embodiment, this mechanism is an algorithm that causes the terminals to randomly select a small number (e.g., 1) of channels for monitoring. The random nature of the algorithm, coupled with a sufficiently large enough number of traffic channels, limits the likelihood that multiple terminals will select and monitor the same traffic channel.

Congestion broadcast messages are periodically/continually received at the terminals from the satellite. The satellite is continually monitoring the traffic channels and, as such, each of the congestion broadcast messages may identify different traffic channels that are likely to become available. In certain embodiments, after the system enters the congestion acquisition mode, the communication terminals are configured to wait a period of time until multiple congestion broadcast messages are received. In one specific such embodiment, the communication terminals are configured to build a list of likely available traffic channels and use this list during the subset selection process. These lists may be built randomly or according to predefined rules that are designed to reduce the likelihood that multiple terminals will monitor the same traffic channel. In another example, the communication terminals are configured to randomly select a point in time and perform the evaluation process on a set of traffic channels identified in the congestion broadcast message(s) received after that point in time.

It will be appreciated that, upon triggering the acquisition congestion mode, the terminals are no longer using the acquisition channels, thereby alleviating some of the congestion at the acquisition channels. As such, in certain embodiments the techniques include a mechanism such that some of the communication terminals will continue to operate in the standard acquisition mode (i.e., continue to use the acquisition channels) while the other terminals operate as described elsewhere herein in the acquisition congestion mode. In one such embodiment, certain classes or types of terminals could respond to the congestion broadcast message while other classes or types of terminals are configured to ignore the congestion broadcast message. In other embodiment, the terminals that enter the acquisition congestion mode may be based on a randomization algorithm. For example, the congestion broadcast message could instruct the terminals to select a number (e.g., between 1-10), and the selected number could determine the operation mode (e.g., selecting a number between 1 and 5 causes the terminal to enter the acquisition congestion mode, while selecting a number between 6 and 10 causes the device to stay in the standard acquisition mode). Other techniques could be used that would result in a graceful reduction in the number of devices trying to use the acquisition channels.

In summary of the above, the subset selection process may be based on randomization and/or predefined rules in order to reduce the likelihood that multiple terminals will monitor and/or select the same traffic channels.

As noted, after selection of the subset of traffic channels, the $Radio_2$ is configured to monitor the subset of channels for an indication that one of the channels is available for use by the $Radio_2$. In other words, $Radio_2$ examines the transmissions on the subset of channels for energy levels or other characteristics that signal that the channel is available. In one example, the $Radio_2$ monitors the channels for an indication of a release message from the satellite (e.g., possibly including an "open" indicator implying the channel is available for a minimum "guard time"). An aspect here is avoidance of (or detection of) simultaneous use of the channel by different terminals (i.e., where a terminal uses what appears to be an open channel that the satellite has already assigned to another terminal via the acquisition channel method).

Additionally, one or more well known techniques may be executed herein for the detection and avoidance of collisions between the radios that are in the same state. In one simple such technique, a first radio ($Radio_2$) and a second radio ($Radio_3$) may each monitor the same channel. Some type of prioritization or communication between $Radio_2$ and $Radio_3$ may be provided so as to avoid or prevent the radios from attempting to use a recently opened channel at the same time. Collision detection and avoidance techniques are well known in the art and are not be described in detail herein.

After a selected traffic channel is identified as being available, the $Radio_2$ is configured to tune to that traffic channel and immediately begin transmitting on the traffic channel. As noted, $Radio_2$ monitored the channel and, as such, observed the messages transmitted by the satellite on the traffic channel to the communication terminal that was previously using the selected channel. By passively listening to the messages transmitted by the satellite and using other information, algorithms and processing methods available to it, $Radio_2$ can receive the benefit of the synchronization performed between the previous terminal and the satellite without needing to perform a synchronization exchange with the satellite. Therefore, the communication terminal is, in effect, passively synchronized to the selected channel by listening to the satellite broadcasts and autonomously performing a synchronization operation. In other words, the $Radio_2$ can begin transmitting on the selected channel without first receiving additional (synchronization) data from the satellite or transmitting synchronization data to the satellite. Additionally, Radio2 may begin transmitting during the "guard time" of the previous session. $Radio_1$ should be programmed to avoid transmissions during the guard time.

To begin transmission, $Radio_2$ transmits a home gateway access message to the satellite and, as described above, the satellite generates a second home gateway access message that is forwarded to the correct gateway. The session occurs and is released as described above.

The above description of FIG. 4 illustrates an example in which the $Radio_2$ selects and monitors a traffic channel that is currently used by another terminal. The $Radio_2$ is then able to tune to the channel and begin transmitting without any active synchronization. It will be appreciated that, in an alternative embodiment, the $Radio_2$ could instead select an open channel (i.e., a channel that is neither currently used by another terminal nor currently available for assignment to another terminal by the satellite via the acquisition channel method). In such arrangements, the $Radio_2$ would detect that the channel is open (e.g., by detecting no transmissions for a period of time), and begin transmitting on the channel. Because no transmissions were detected, the $Radio_2$ would first need to either actively or passively synchronize to the satellite before transmitting traffic. Determination of the active or passive method would depend upon state information stored within the terminal and the synchronization algorithms and methods available at the terminal.

Having described techniques for enabling acquisition of a traffic channel during acquisition congestion, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for channel acquisition at a communication terminal in a communication network, comprising:
   receiving a broadcast message from a network node, wherein the broadcast message indicates that one or more acquisition channels in the communication network are congested and identifies a set of traffic channels likely to become available for use by the communication terminal, wherein the one or more acquisition channels comprise channels used by communication terminals within a given boundary to acquire traffic channels, and wherein the set of traffic channels comprise channels used for assignment to the communication terminals for transmission of traffic;
   selecting a subset of the set of traffic channels;
   monitoring the selected subset of traffic channels for an indication that a first one of the traffic channels in the selected subset of traffic channels is available for use by the communication terminal; and
   transmitting traffic on the first traffic channel.

2. The method of claim 1, wherein when the one or more acquisition channels in the communication network are not congested, a communication terminal is configured to acquire a traffic channel by transmitting a channel acquisition request to the network node via one of the one or more acquisition channels, and wherein the method further comprises:
   performing the selecting, monitoring, and transmitting without sending a channel acquisition message to the network node.

3. The method of claim 1, wherein when the one or more acquisition channels in the communication network are not congested, a communication terminal is configured to actively synchronize with the network node, and wherein the method further comprises:
   transmitting traffic on the first traffic channel without actively synchronizing with the network node.

4. The method of claim 1, wherein selecting a subset of the set of traffic channels comprises:
   selecting one traffic channel from the set of traffic channels.

5. The method of claim 1, wherein selecting a subset of the set of traffic channels comprises:
   randomly selecting one or more traffic channels.

6. The method of claim 1, wherein selecting the subset of traffic channels comprises:
   waiting a period of time so as to receive a plurality of broadcast messages;
   generating, based on the plurality of broadcast messages, a list of traffic channels likely to become available for use by the communication terminal; and
   selecting the subset of traffic channels based on the list of traffic channels.

7. The method of claim 1, wherein the broadcast message includes an identification of the type of traffic on each of the traffic channels in the set of traffic channels.

8. The method of claim 1, wherein the broadcast message identifies a set of traffic channels that are only used for a set of specific transmission types.

9. The method of claim 8, where the specific transmission types include limited duration or short-burst traffic.

10. The method of claim 1, wherein monitoring for the indication comprises:
monitoring the subset of traffic channels for an indication of a release message.

11. The method of claim 1, wherein transmitting traffic on the selected traffic channel includes:
transmitting a home gateway access message to the network node.

12. The method of claim 1, wherein the communication terminal is a terrestrial device transmitting to the network node device that is a satellite.

13. The method of claim 1, wherein transmitting traffic on the first traffic channel comprises:
transmitting voice signals.

14. The method of claim 1, wherein transmitting traffic on the first traffic channel comprises:
transmitting data.

15. A non-transitory processor readable medium in a communication terminal storing instructions that, when executed by a processor, cause the processor to:
select a subset of traffic channels based on a broadcast message received from a network node, wherein the broadcast message indicates that one or more acquisition channels in a communication network are congested and identifies a set of traffic channels likely to become available for use by the communication terminal, wherein the one or more acquisition channels comprise channels used by communication terminals within a given boundary to acquire traffic channels, and wherein the set of traffic channels comprise channels used for assignment to the communication terminals for transmission of traffic;
monitor the selected subset of traffic channels for an indication that a first one of the traffic channels in the selected subset of traffic channels is available for use by the communication terminal; and
transmit traffic on the first traffic channel.

16. The non-transitory processor readable medium of claim 15, wherein when the one or more acquisition channels in the communication network are not congested, a communication terminal is configured to acquire a traffic channel by transmitting a channel acquisition request to the network mode via one of the one or more acquisition channels, and wherein the processor readable medium further comprise instructions that cause the processor to:
select, monitor, and transmit without sending a channel acquisition message to the network node.

17. The non-transitory processor readable medium of claim 15, wherein when the one or more acquisition channels in the communication network are not congested, a communication terminal is configured to actively synchronize with the network node, and wherein the processor readable medium further comprise instructions that cause the processor to:
transmit traffic on the first traffic channel without actively synchronizing with the network node.

18. The non-transitory processor readable medium of claim 15, wherein the instructions that cause the processor to select a subset of the set of traffic channels comprises instructions that cause the processor:
randomly select one or more traffic channels.

19. A communication terminal in a communication network, comprising:
an antenna configured to receive a broadcast message from a network node, wherein the broadcast message indicates that one or more acquisition channels in the communication network are congested and identifies a set of traffic channels likely to become available for use by the communication terminal, wherein the one or more acquisition channels comprise channels used by communication terminals within a given boundary to acquire traffic channels, and wherein the set of traffic channels comprise channels used for assignment to the communication terminals for transmission of traffic;
a processor configured to:
select a subset of the set of traffic channels;
monitor the selected subset of traffic channels for an indication that a first one of the traffic channels in the selected subset of traffic channels is available for use by the communication terminal; and
transmit traffic on the first traffic channel.

20. The communication terminal of claim 19, wherein when the one or more acquisition channels in the communication network are not congested, a communication terminal is configured to acquire a traffic channel by transmitting a channel acquisition request to the network node via one of the one or more acquisition channels, and wherein the processor is further configured to select, monitor, and transmit without sending a channel acquisition message to the network node.

21. The communication terminal of claim 19, wherein when the one or more acquisition channels in the communication network are not congested, a communication terminal is configured to actively synchronize with the network node, and wherein the processor is further configured to:
transmit traffic on the first traffic channel without actively synchronizing with the network node.

22. The communication terminal of claim 19, wherein to select a subset of the set of traffic channels, the processor is configured to select one traffic channel from the set of traffic channels.

23. The communication terminal of claim 19, wherein to select a subset of the set of traffic channels, the processor is configured to randomly select one or more traffic channels.

24. The communication terminal of claim 19, wherein to select a subset of the set of traffic channels, the processor is configured to:
wait a period of time so as to receive a plurality of broadcast messages;
generate, based on the plurality of broadcast messages, a list of traffic channels likely to become available for use by the communication terminal; and
select the subset of traffic channels based on the list of traffic channels.

25. The communication terminal of claim 19, wherein to monitor for the indication, the processor is configured to monitor the subset of traffic channels for an indication of a release message.

26. The communication terminal of claim 19, wherein the communication terminal is a terrestrial device transmitting to the network node device that is a satellite.

* * * * *